United States Patent [19]

Artman

[11] 4,320,727

[45] Mar. 23, 1982

[54] PROCESS OF FUEL STRATIFICATION WITHIN AND VENTING OF ENGINE AUXILIARY COMBUSTION CHAMBER

[76] Inventor: Noel G. Artman, 15830 Nicklaus La., Sun City, Ariz. 85351

[21] Appl. No.: 219,462

[22] Filed: Dec. 23, 1980

Related U.S. Application Data

[62] Division of Ser. No. 105,074, Dec. 19, 1979.

[51] Int. Cl.³ .......................... F02B 3/00; F02B 23/00
[52] U.S. Cl. .................... 123/290; 123/260; 123/261; 123/263; 123/275; 123/283; 123/291
[58] Field of Search ............... 123/263, 275, 276, 277, 123/283, 286, 290, 260, 291

[56] References Cited

U.S. PATENT DOCUMENTS

| | | | |
|---|---|---|---|
| 1,919,488 | 7/1933 | Thulin | 123/263 |
| 2,223,090 | 11/1940 | Boxan | 123/263 |
| 3,304,922 | 2/1967 | Hidel | 123/283 |

FOREIGN PATENT DOCUMENTS 2715943 10/1978 Fed. Rep. of Germany ...... 123/326

*Primary Examiner*—Ronald B. Cox

[57] ABSTRACT

Stratified charge four-stroke-cycle internal combustion engine with fuel injection and spark-ignition of the type wherein stratification and initial combustion occurs in a combustion chamber auxiliary to the variable volume space in the engine cylinder between the piston and the cylinder head. Unique aspirating passage means communicating between the auxiliary chamber and the variable volume space conducts and causes air entering the chamber at one end, pursuant to the piston's compression stroke, to form a substantially non-turbulent air column rotating about the chamber axis and acretively compressed, by continued entry of air, toward and against the opposite end of the chamber. Fuel is injected into air initially in the chamber and that initially entering through the aspirating passage to mix with such air to form a spark-ignitable air-fuel mixture compressed against said other chamber end. The remaining air forced into the chamber pursuant to the compression stroke comprises a substantially discrete mass creating the desired compression of the chamber contents for spark-ignition and combustion of the fuel. After the combustion and exhaust cycles that sequentially follow ignition, there remains a residue of combustion products in the combustion chamber. These products are swept from this chamber through the aspirating passage into the variable volume space by replacement air, pursuant to the ensuing air intake stroke of the piston, that is allowed to enter the chamber through a valve-controlled inlet passage leading into the chamber adjacent its said other end. Fresh air is thus provided in the chamber for compression into the succeeding air-fuel mixture stratum to promote reliable ignition and operation with a small amount of fuel for engine idle and part load conditions. Additional fuel is injected into the entering discrete air mass in an amount proportional to desired additional power output for the engine.

8 Claims, 5 Drawing Figures

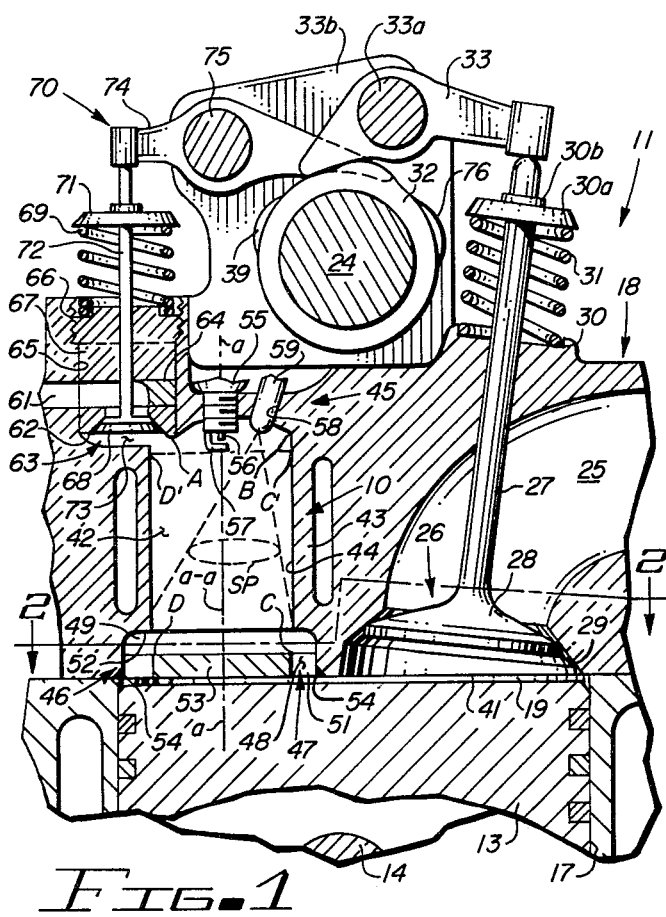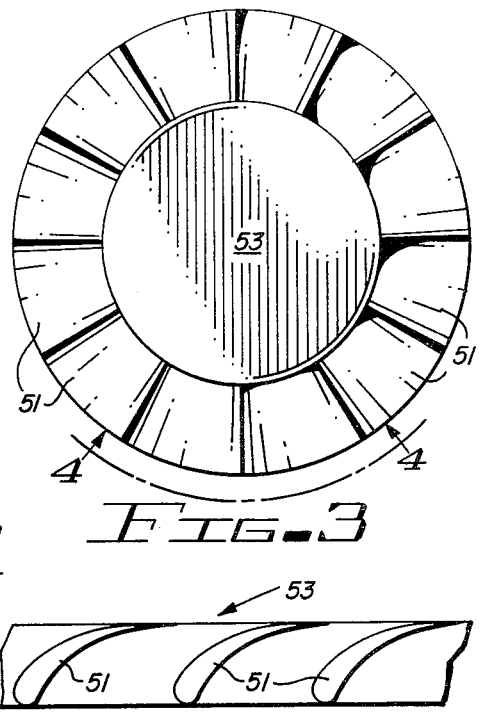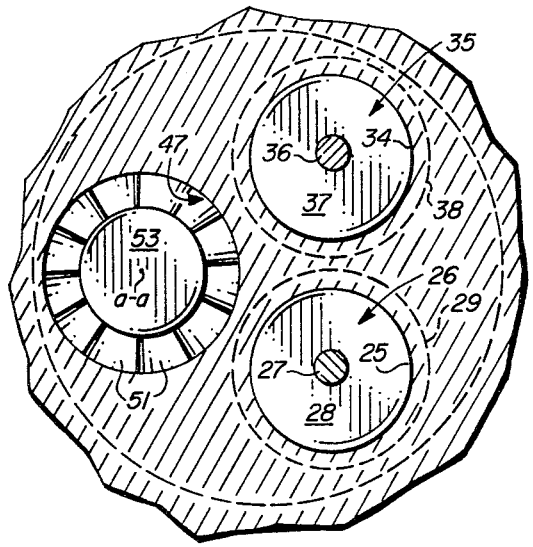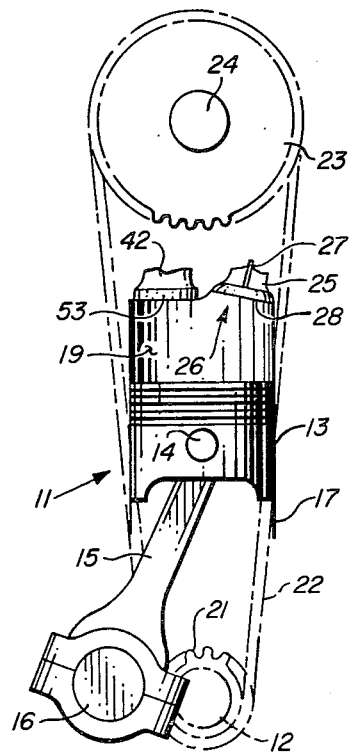
FIG.-1
FIG.-2
FIG.-3
FIG.-4
FIG.-5

PROCESS OF FUEL STRATIFICATION WITHIN AND VENTING OF ENGINE AUXILIARY COMBUSTION CHAMBER

This is a division of application Ser. No. 105,074, filed Dec. 19, 1979.

SUMMARY OF THE INVENTION

This invention relates to internal combustion engines of the type wherein combustion is initiated in a combustion chamber auxiliary to and communicative with what is commonly termed the combustion chamber of an orthodox Otto or four-stroke-cycle engine. The invention particularly concerns an auxiliary or precombustion chamber structure and combustion process utilizing fuel injection to form a spark-ignited air-fuel mixture as distinguished from compression ignition in which ignition occurs at higher pressure and temperature of the combustibles. Diesel (compression ignition) engines of the precombustion chamber species have historically operated in an acceptable manner without venting residue combustion products from that chamber because of its small volume, typically 1/16th of the volume occupied by the same quantity of air at atmospheric pressure. Hence the oxygen particles of the air compressed into the Diesel engine precombustion chamber, in addition to being at the flash point temperature of the Diesel fuel injected thereinto, are crowded together for profuse contact and oxydizing relation with the hydrocarbons of this fuel. The products of combustion residue remaining in this precombustion chamber after exhaust of the engine cylinder and filling of such cylinder with air during the ensuing air intake stroke of the cylinder's piston are at or less than atmosphere pressure and constitute no more than (typically) 1/16th of the volume of air to be forced into the precombustion chamber and thus mixed therewith pursuant to the ensuing compression stroke of the piston. With this low volume ratio of residue combustion products to that of air compressed into the precombustion chamber, and the fuel flash point temperature of the air, the manner of injection which causes the fuel to indiscriminately contact oxygen molecules throughout the compressed mass of swirling air, the presence of such residue products does not prevent compression ignition and combustion with acceptable reliability and efficiency.

Contrarily, in the matter of the spark-ignition system in which the precombustion chamber is of greater volume 1/7th or ⅛th that of the displacement (variable volume) space in the engine cylinder, for example, in contrast to 1/16th as explained above, the oxygen molecules of the air compressed into the chamber are spaced apart more distantly, and the air temperature is much below flash point temperature of the injected fuel. Another factor inhibitive of ignition and efficient burning of fuel injected into the larger volume precombustion chamber is this chamber's greater volume content of noncombustible products retained from a previous combustion and which, when mixed with the charge of compressed fresh air, dilutes this air to greater extent.

An object of this invention relates to an Otto cycle engine precombustion chamber wherein fuel is injected and which has an aspirating passage at an end communicating with a variable volume space within a cylinder of such engine, and is the provision of a valve-controlled air inlet communicating with such chamber at the opposite end in spaced relation to the aspirating passage and operable during at least a portion of the air intake stroke of the piston in such cylinder to admit air into said chamber to replace and force at least a portion of residue products of a preceding combustion through the aspirating passage into the variable volume space.

One purpose of the auxiliary combustion chamber is its adaptability to the formation therein of an air-fuel stratum of ideal mixture for ignition and discrete from the remaining chamber content which varies from air substantially unmixed with fuel to air mixed with a combustion-sustaining quantity of fuel variable according to whether the engine is to operate under idling, part load, or full load conditions. Contaminants of a previous combustion, if left in an unscavenged precombustion chamber, would be concentrated by being compressed into the stratum where ignition occurs, thereby requiring a greater quantity of injected fuel to attain operation and reliability of ignition, particularly under idle or part load conditions. This is a further reason for the valve-controlled air inlet and its function to scavenge products of a previous combustion from the chamber.

A further object of this invention is the provision of an auxiliary combustion chamber structure which controls the flow of air entering the same in a manner obtaining improved stratification within the chamber. This is done by so constructing the aspirating passage communicating between the engine cylinder variable volume space and the precombustion chamber that air entering the chamber from such space is first directed circumferentially of the chamber into an open channel circumscribing the chamber inner periphery near an end of the chamber. From this channel the air is directed radially inwardly of the chamber to form an end portion of an air column rotating about the chamber axis while being compressed toward the opposite end of the chamber by additional air similarly directed. The channel inhibits any part of the entering air flowing jet-like axially within the chamber which character of flow would create turbulence throughout the entire air mass within the chamber and thus inhibit stratification.

The invention also contemplates a precombustion chamber structure with stratification performance characteristics and of physical form that when disposed in the cylinder head of a reciprocating piston engine, no part of the structure must project from the face of that head into the variable volume space between that face and the engine piston.

DESCRIPTION OF DRAWING FIGURES

FIG. 1 is a fragmentary sectional view of an engine cylinder, piston and cylinder head in which there is an auxiliary internal combustion chamber structure embodying a preferred form of structure adapted to perform a process within the scope of this invention.

FIG. 2 is a fragmentary sectional view taken on the line 2—2 of FIG. 1, in the direction indicated by the arrows associated with that line.

FIG. 3 is an enlarged inner end face view of a prefabricated part assembled into the lower end portion of the auxiliary combustion chamber structure.

FIG. 4 is a fragmentary panoramic side elevational view taken on the line 4—4 of FIG. 3, in the direction indicated by the arrows associated with that line.

FIG. 5 is a fragmentary diagrammatic non-scaled view illustrating the drive train for the engine valve-operating cam shaft.

DESCRIPTION AND EXPLANATION OF THE ILLUSTRATED FORM OF THE INVENTION

The auxiliary internal combustion chamber structure 10, FIG. 1, and controls therefor, constituting generally the preferred form of structure adapted to perform a process encompassed by this invention, are illustrated as part of an engine 11, FIGS. 1 and 4, of the well-known Otto or four stroke cycle type, using gasoline or equivalent evaporative fuel adapted for spark ignition. The crankshaft 12 of this engine is driven by one or more pistons 13 of which each is connected to the crankshaft by a piston pin 14, a connecting rod 15 and a crank bearing 16 of the crankshaft. The piston reciprocates in a cylinder 17 wherein this piston and a cylinder head 18 bound a variable volume space 19. A sprocket 21 rotating with the crankshaft and through a chain or positive-drive belt 22 and sprocket 23 drives the engine overhead camshaft 24 synchronously with the crankshaft and in timed relation with reciprocative movement of the piston.

Air is admitted to the variable volume space 19 through an inlet passage 25 controlled by an inlet poppet valve 26 of conventional construction having a stem 27 and a head 28 shown in FIG. 1 resting on a seat 29. The valve is closable upon the seat 29 by a spring 31 and unseatable against the force of this spring by a cam lobe 32 rotatable with the camshaft 24 to pivot the rocker arm 33, thus forcing the valve stem and its head 28 downwardly. Rocker arm 33 is pivoted on a bearing 33a supported by a bracket 33b projecting upwardly from the cylinder head 18. Valve spring 31 reacts between a valve seat 30 and a spring cup 30a constrained against axial movement on the stem 27 by a snap ring 30b. Orthodox venting of the variable volume space 19 is through an exhaust passage 34, FIG. 2, controlled by an exhaust valve 35. This valve is constructed and operated similarly to the inlet valve 26, it having a stem 36 and a head 37 cooperable with a seat 38 therefor. Valve 35 operates under control of a cam lobe 39 rotatable with camshaft 24 and that pivots a rocker arm (not shown) similar to 33 to compress a spring (not shown), operating similarly to 31, to unseat the valve head 37.

The engine thusfar described is of conventional structure with the exception of the chamber structure 10 and that on completing the up-stroke of the piston 13 the variable volume space 19 is diminished inordinately by this flat top piston approaching more closely to the cylinder head underface 41. This diminished clearance between the piston and the cylinder head underface is to provide that, on the compression up-stroke of the piston 13, most of the air thus compressed will be forced from the variable volume space into and for compression in combustion chamber 42 of chamber structure 10.

The combustion chamber structure 10 includes a sidewall 43 having a cylindrical inner periphery 44 and endwall portions 45 and 46 spaced apart axially of such periphery to complement the sidewall in the formation and enclosure of the chamber 42. The principal axis of chamber 42 and of the sidewall periphery 44 is designated a—a. Combustion chamber structure 10 includes aspirating passage means 47 communicating between chamber 42 and the variable volume space 19. Such passage means has a duct portion 48 and a channel portion 49 in communicative series therewith. The channel portion 49 is in the form of an open channel in the sidewall periphery 44 contiguous to the lower endwall portion 46 and extending circumferentially of such periphery substantially within a plane perpendicular to the principal axis a—a. The duct portion 48 is in the form of an annular opening communicating with the variable volume space 19 and leading therefrom through the lower endwall portion 46 in axial registry with the sidewall 43. Duct portion 48 includes air deflector vanes 51, FIGS. 1, 2 and 3, spaced apart linearly of such annular opening and tilted in the same direction helically with respect to the chamber axis a—a to discharge compressed air from the variable space linearly of and into the open channel 49. An air deflecting shoulder 52 of open channel 49 is in opposed spaced relation to that part of the chamber endwall portion 46 comprising the air deflector vanes 51 to cause displacement of the air directed thereagainst by said vanes radially inwardly of the combustion chamber so no jet-like flow occurs axially of the chamber cylindrical periphery. Endwall portion 46 of the chamber structure 10 includes a prefabricated disc-like part 53 having the vanes 51 preassembled therewith. These vanes may be fabricated from heat resisting metal such as titanium or an alloy thereof and may be assembled with the part 53 in the fashion of turbine blades to their rotor. The radially outer ends of these vanes are welded in place to the cylinder head 18 as shown at 54.

A spark plug 55 mounted in the upper endwall portion 45 coaxially of the combustion chamber presents air-fuel mixture igniting means in the form of spark-gap electrodes 56 and 57. A bore 58 through the endwall portion constitutes means accommodative of and for mounting a fuel injector 59. An air inlet passage 61 leads laterally into the combustion chamber through the sidewall 43 adjacently to the upper endwall portion 45. This passage leads through an annular valve seat 62 of inlet valve means 63 and a C-shaped spacer member 64. The valve seat 62 and spacer member 64 are mounted in a cylinder head bore 65 where they are retained by a bearing plug 67 screwed into a threaded portion 66 of such bore. Inlet valve means 63 includes a head 68 releasably held on the valve seat 62 by a spring 69 reacting between the plug 67 and a spring cup 71 mounted on the valve stem 72 of valve head 68. Valve 63 is opened when the stem 72 is forced downwardly, displacing the head 68 from the seat 62 into an enlarged vestibule portion 73 of the air inlet passage. Inlet valve operating means 70 for operating valve 63 includes a rocker arm 74 pivotal on a bearing 75 supported in the bracket 33b and a cam lobe 76 rotatable with the camshaft 24 to effect operation of the valve in timed relation with movement of the engine piston 13.

Operation of this engine with its improved components is as follows: Starting with the downward air-intake stroke of piston 13, air is drawn into the variable volume space 19 through the then open inlet valve 26. The exhaust valve is closed during this piston stroke. Cam lobe 76 pivots rocker arm 74 to open air inlet valve 63 immediately after commencement of the piston air-intake stroke; that is, preferably as soon as the air pressure in the variable volume space 19 becomes subatmospheric, and is allowed to remain open long enough for the air thus admitted into the combustion chamber 42 to replace and discharge at least a substantial part of the products of the previous combustion from this chamber through the aspirating passage means 47 into the variable volume space.

During the ensuing compression stroke of piston 13 the exhaust valve 35 remains closed and both inlet valves 26 and 63 are closed. Air compressed in the contracting variable volume space 19 is forced from this space through the aspirating passage means 47 into the combustion chamber 42. The air passing through the annular duct portion 48 of this passage means is deflected by the vanes 51 helically relatively to the combustion chamber axis a—a and linearly of and into the open channel 49 toward the shoulder 52 which further deflects the incoming annular air stream into the form of a substantially flat annulus rotating within a plane or planes perpendicular to axis a—a; that is, with cessation of the helical motion or any component of motion axially of the combustion chamber. The shoulder 52 directs the rotating annulus of air into the combustion chamber adjacently to its lower endwall part 53 from where such rotating air, by sustained flow from the rotating annulus, is displaced and compressed upwardly in the form of an air column rotating, spinning or swirling as a relatively nonturbulant mass about the combustion chamber axis pursuant to the compression stroke of the engine piston.

Fuel injection into the combustion chamber from the injector 59 may always commence at the same time which may be near completion of the air intake stroke and continue for a time determinable of engine power output. Under engine idling conditions, fuel injection commencing near the end of the air intake stroke would continue for only a very short time, for example, until commencement of the compression stroke. In such instance the fuel directed in the form of a spray pattern, as illustrated at SP in FIG. 1, toward the lower endwall of the combustion chamber would atomize and mix with air in the chamber. This air and the fuel thus mixed therewith is the first to be compressed upwardly in the combustion chamber by the rotating air column accretively advanced from the bottom of the chamber as above explained, pursuant to the compression stroke of engine piston 13. Note in FIG. 1 that the air column completely filling the combustion chamber at the beginning of the compression stroke occupies the space ABCD, but during that stroke is compressed to a density to occupy the much foreshortened space ABC'D'. Thus there is formed adjacent the chamber upper endwall a compressed stratum of combustible air-fuel mixture which with the proper amount of injected fuel will consist of an air to fuel stoichiometric ratio, approximately 15 to 1 being ideal for spark ignition of air and gasoline. Of the completely compressed and spinning column within the chamber 42, that portion adjacent the lower endwall and extending upwardly to the stratum or mass of air-fuel mixture portion constitutes a stratum or discrete mass of predominately air adjoining the air-fuel mixture mass. It is not imperative that the lower part of the air-fuel stratum or mass shall engage the upper part of the air stratum or mass at a thin cleavage-like plane perpendicular to the chamber axis a—a such as would contain and coincide solely and precisely with a boundry as C'D' between the masses respectively in spaces as ABC'D' and D'C'CD. Some localized interprotrusion and intermixing of these two masses may occur at their juncture without significant impairment of the ignition and combustion process, providing migration of fuel particles from the air-fuel mass into the predominately air mass is so limited that the readily ignitable and combustible character of the air-fuel mass enveloping the electrodes 56,57 endures until ignition occurs.

To increase engine power output the fuel injection period is lengthened but, after fuel cut-off, delivery of air continues for the full compression stroke of the engine piston to form the lower stratum of air in the combustion chamber and place full charge of air in the chamber to create the desired density for ignition and combustion of the fuel. The volume of chamber 42 will be, for example, 1/7th that of the variable volume space 19 so the pressure in this chamber upon completion of the compression stroke will be about the same as that in the variable volume space of a typical spark ignition engine having an 8 to 1 compression ratio. At full load, injection may continue through ¾ths of the compression stroke, for example, although the injection rate is also a factor in determining the time of fuel delivery cut-off. But with all operation at less than full load there will be an upper stratum of ignitable combustible air-fuel mixture enveloping the space between the spark plug electrodes and a lower stratum of air, the upper stratum being thicker axially of the chamber and thus more voluminous in proportion to the amount of power to be delivered by the engine.

Ignition will occur slightly before or at about commencement of the power stroke of piston 13. The flame front of burning fuel ensuing spark at the electrodes 56–57 advances spherically therefrom through the air-fuel mixture stratum, increasing the temperature and pressure in the combustion chamber, forcing the hot gasses through the annular aspirating passage 47 into the variable volume space 19 to force the piston 13 downwardly in effecting its power stroke. At full load the amount of fuel in the air compressed into the combustion chamber may be such that some unburned particles of fuel will be swept into the variable volume space before their combustion occurs. This occurance is particularly likely with respect to fuel injected against the endwall part 53 and the vanes 51 that is not mixed with and swept into the chamber by the air rushing thereinto during the compression stroke.

During the exhaust stroke of the piston 13, that next follows, only the exhaust valve 35 will be open. Products of combustion will be exhausted from the contracting variable volume space 19 but not from the combustion chamber 42. This is an operating characteristic that improves emissions control. The combustion products retained in the combustion chamber amount to about ⅛th of the total thereof in this chamber and in the variable volume space following the piston's power stroke, so about ⅞ths of these combustion products are exhausted during the exhaust stroke. However, as explained above, during the ensuing intake stroke the air inlet valve 63 opens, permitting air to replace and force the residue combustion products from the chamber 42 into the variable volume space 19. Since fuel is injected into this replacement air and later, during the compression stroke, compressed with this air into a combustible air-fuel mixture stratum enveloping the spark electrodes 57-56, the residue combustion products do not impede ignition and combustion of the fresh air-fuel charge. Instead, these residue combustion products, during the compression stroke, are dispersed within the air forced through the aspirating passage 47 to form the lower stratum in chamber 42 immediately preceding ignition. Pursuant to combustion that follows this ignition, said dispersed products are again subjected to the combustion flame front, heat and pressure which causes at least part of the hydrocarbons and carbon monoxide to oxidize, burn, thus utilizing their latent energy and avoiding their exhaust into the atmosphere, as polluting emissions.

I claim:

1. An internal combustion engine operational process involving an Otto cycle engine cylinder and a piston reciprocal therein attendant to alternate expansion and contraction of a variable volume space in said cylinder, an auxiliary combustion chamber having opposed endwall portions spaced apart axially of a principal axis of such chamber wherein an air-fuel mixture is combustible, and aspirating passage means communicating between said space and the interior of the chamber adjacently to one of said endwall portions; said process comprising the sequential steps of introducing air into said chamber contiguously to the other endwall portion during a portion of the air intake stroke of the piston to forcibly exhaust the products of a previously combusted air-fuel mixture from the chamber through the aspirating passage means into the variable volume space, next, pursuant to the ensuing compression stroke of the piston, compressing and forcibly introducing air from said space and through the aspirating passage means into said chamber contiguously to the one endwall portion with a swirling motion to a major portion of such introduced air about and converging toward said axis, injecting fuel into the swirling air in an amount to mix and form therewith a combustible air-fuel mixture, terminating the injection, continuing the introduction of air and swirl thereof to form a column of air compressing the combustible mixture into a discrete mass displaced by said column toward the other endwall portion, and igniting the compressed combustible mixture in such timed relation with movement of the piston that ensuing burning and heated gas composed of said fuel and air expands through the aspirating passage means into the variable volume space to effect a power stroke of the piston.

2. The process of forming and burning a stratified body comprised of a mass of combustible air-fuel mixture and an adjoining column of air within an internal combustion engine precombustion chamber containing the products of a previously combusted mass of such a mixture and having a principal axis and opposed ends spaced apart axially of such chamber and which communicates through one of such ends with the variable volume space in a cylinder of such engine; said process comprising the steps of introducing air into said chamber contiguously to the other of such ends attendant to thereby exhausting said combusted products from the chamber through the one end into said space, thereafter introducing air from said space through the one end into the chamber attendant to swirling a major portion of such air about and converging toward said axis, injecting fuel into the swirling air in an amount to mix and form therewith a combustible air-fuel mixture, terminating the injection, continuing the introduction of air and swirl thereof to form a column of air compressing the combustible mixture into a concentrated mass adjacent said other end to a pressure insufficient to cause compression ignition, and igniting the air-fuel mixture.

3. The process of forming a stratified body comprised of a mass of combustible air-fuel mixture and an adjoining mass of air within an internal combustion engine precombustion chamber having a sidewall generated circularly about a principal axis of such chamber and opposite end portions spaced apart axially of such chamber which includes a passage communicating through one of such end portions with a variable volume space in a cylinder of such engine; said process comprising the steps of creating an air-fuel mixture within said chamber, introducing air from said space through said passage into the one chamber end portion with a circular motion within and linearly of an annular space embracing the chamber axis contiguously with said end portion and with a portion of said sidewall, directing at least a major portion of the air from said annular space and into the chamber while creating with such directed air a spiral current thereof diminishing in radius relatively to said axis to form with the air-fuel mixture respective adjoining portions of a column spinning about the chamber axis, and continuing said introduction of air and said directing thereof to compress the air-fuel portion of the spinning column into a discrete mass contiguous with the other end portion of the chamber.

4. The process set forth in claim 3, wherein the precombustion chamber includes an inlet passage within the other of its end portions and contains the products of a previously combusted air fuel mass, and which process includes a step of introducing air through said inlet passage into said chamber attendant to exhausting the combusted products through the one end portion passage into the cylinder variable volume space preceding the step of introducing air from the variable volume space into the chamber.

5. An internal combustion engine operational process involving an Otto cycle engine cylinder and piston reciprocal therein attendant to alternate expansion and contraction of a variable volume space in said cylinder, an auxiliary combustion chamber having opposed endwall portions spaced apart axially of a principal axis of such chamber wherein an air-fuel mixture is combustible, and aspirating passage means communicating between said space and the interior of the chamber adjacently to one of said endwall portions; said process comprising the sequential steps of introducing air into said chamber contiguously to the other endwall portion during a portion of the air intake stroke of the piston to forcibly exhaust the products of a previously combusted air-fuel mixture from the chamber through the aspirating passage means into the variable volume space, next, pursuant to the ensuing compression stroke of the piston, compressing and forcibly introducing air from said space and through the aspirating passage means into said chamber contiguously to the one endwall portion with a swirling motion about said axis, deflecting the swirling air to effect flow of at least a major portion thereof spirally inwardly of the chamber radially of its axis while such deflected air is contiguous to said one endwall portion, injecting fuel into the swirling air in an amount to mix and form therewith a combustible air-fuel mixture, terminating the injection, continuing the introduction of air and spiral flow and swirl thereof to form a column of air compressing and displacing the combustible mixture into a discrete mass toward the other endwall portion, and igniting the compressed combustible mixture in such timed relation with movement of the piston that ensuing burning and heated gas composed of said burning fuel and air expands through the aspirating passage means into the variable volume space to effect a power stroke of the piston.

6. The process of forming and burning a stratified body comprised of a mass of combustible air-fuel mixture and an adjoining column of air within an internal combustion engine precombustion chamber containing the products of a previously combusted mass of such a mixture and having a principal axis and opposed ends spaced apart axially of such chamber and which communicates through one of such ends with the variable volume space in a cylinder of such engine; said process comprising the steps of introducing air into said chamber contiguously to the other of such ends attendant to thereby exhausting said combusted products from the chamber through the one end into said space, thereafter introducing air from said space through the one end into the chamber attendant to swirling such air about said axis, deflecting the swirling air to effect flow of at least a major portion thereof spirally inwardly of the chamber radially of its axis while such deflected air is contiguous to said one end of the chamber, injecting fuel into the deflected air in an amount to mix and form therewith a combustible air-fuel mixture, terminating the injection, continuing the introduction of air and spiral flow and swirl thereof to form a column of air compressing the combustible mixture into a concentrated mass displaced by such column toward said other end to a pressure insufficient to cause compression ignition, and igniting the compressed concentrated mass.

7. The process of forming a stratified body comprised of a mass of combustible air-fuel mixture and an adjoining mass of predominantly air within an internal combustion engine precombustion chamber having a sidewall generated circularly about a principal axis of such chamber and opposite end portions spaced apart axially of such chamber which includes a passage communicating through one of such end portions with a variable volume space in a cylinder of such engine; said process comprising the steps of creating an air-fuel mixture within said chamber, forcing air from said space to enter the chamber through said passage, imparting to the entering air while contiguous to the one end portion a spiral motion to a major portion of such entering air about and converging toward the chamber axis, continuing the forced entry of air to progressionally replace, compress, and displace the converging spiral of air into the form of a columnar mass spinning about said axis and projecting axially of the chamber to compress and displace at least a portion of the air-fuel mixture mass toward and at least partially into contiguity with the other chamber end portion.

8. In a process of preparing a combustible air-fuel mixture within a precombustion chamber of an internal combustion engine cylinder having a variable volume space in which air is compressed during the compression stroke of a piston therein and said chamber having a sidewall generated circularly about a principal axis thereof and opposite end portions spaced apart axially of such chamber which includes a passage communicating through one of said end portions between said variable volume space and the interior of the chamber adjacently to such end portion; the steps of incurring flow of air from said space through said passage into the chamber pursuant to compression stroke movement of the piston, creating with at least a major portion of such flowing air while contiguous to the one end portion a vortex encircling said axis and contracting radially of the chamber toward said axis, injecting fuel into said vortex in an amount to create with air thereof a combustible air-fuel mixture, and ceasing such injection while continuing said flow of air during continuation of the piston compression stroke.

* * * * *